US007090907B2

(12) United States Patent
Fearn et al.

(10) Patent No.: US 7,090,907 B2
(45) **Date of Patent: *Aug. 15, 2006**

(54) ADHESIVE COATED LABEL HAVING TACTILE FEEL

(75) Inventors: Richard Fearn, Milford, OH (US); Richard Spear, Cincinnati, OH (US)

(73) Assignee: Spear USA, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/280,780

(22) Filed: Oct. 25, 2002

(65) Prior Publication Data

US 2003/0232168 A1 Dec. 18, 2003

Related U.S. Application Data

(60) Provisional application No. 60/389,633, filed on Jun. 18, 2002.

(51) Int. Cl.
*B32B 9/00* (2006.01)

(52) U.S. Cl. ....................... 428/42.3; 40/638; 156/250; 156/277; 283/81; 428/40.1; 428/40.4; 428/41.3; 428/41.5; 428/41.7; 428/42.2; 428/201; 428/202; 428/203; 428/204; 428/353; 428/354

(58) Field of Classification Search ............... 428/40.1, 428/40.2, 42.1, 42.2, 42.3, 41.3, 41.5, 41.7, 428/201, 202, 203, 204, 353, 354; 156/250, 156/277; 283/81; 40/638
See application file for complete search history.

(56) References Cited

U.S. PATENT DOCUMENTS

| | | | | |
|---|---|---|---|---|
| 2,133,081 | A * | 10/1938 | Colvin | 428/30 |
| 2,351,933 | A | 6/1944 | Decker et al. | 41/33 |
| 3,791,841 | A | 2/1974 | Carmellini et al. | 428/207 |
| 4,073,992 | A | 2/1978 | Lerman et al. | 428/207 |
| 4,219,596 | A | 8/1980 | Takemoto et al. | 428/41 |
| 4,391,853 | A | 7/1983 | Pointon | 427/152 |
| 4,401,050 | A * | 8/1983 | Britt et al. | 116/205 |
| 4,935,300 | A | 6/1990 | Parker et al. | 428/352 |
| 5,104,719 | A | 4/1992 | Kamen et al. | 428/195 |
| 5,215,622 | A | 6/1993 | Schmelzer | 156/566 |
| 5,284,688 | A | 2/1994 | Hiatt | 428/40 |
| 5,366,251 | A | 11/1994 | Brandt et al. | 283/81 |
| 5,380,572 | A | 1/1995 | Kotani et al. | 428/40 |
| 5,458,714 | A * | 10/1995 | Brandt et al. | 156/237 |
| 5,512,122 | A * | 4/1996 | Sokyrka | 156/275.5 |
| 5,725,966 | A | 3/1998 | Abe et al. | 429/167 |
| 5,741,387 | A | 4/1998 | Coleman | 156/240 |

(Continued)

FOREIGN PATENT DOCUMENTS

EP 000811477 A1 * 5/1997

(Continued)

*Primary Examiner*—Nasser Ahmad
(74) *Attorney, Agent, or Firm*—Thompson Hine LLP

(57) ABSTRACT

An adhesive coated label includes indicia disposed on a facestock and layers of tactile coating selectively applied to discrete areas of the facestock to create distinct raised portions on the label. The tactile coating may be applied to correspond to the location of the indicia, wherein the raised portions overlie the indicia. A separate layer of primer may be applied to the facestock to cover substantially an entire side of the facestock. A plurality of such labels may be provided on a web of release liner which has been formed into a roll. The label may be applied to a container and the raised portions of the label provide tactile feel which enhances the aesthetic qualities of the label and container.

11 Claims, 2 Drawing Sheets

U.S. PATENT DOCUMENTS

| | | | | |
|---|---|---|---|---|
| 5,773,112 | A | 6/1998 | Tachikawa et al. | 428/40.1 |
| 6,099,944 | A | 8/2000 | Laprade et al. | 428/195 |
| 6,127,032 | A | 10/2000 | Kelch et al. | 428/335 |
| 6,170,881 | B1 | 1/2001 | Salmon et al. | 283/91 |
| 6,242,510 | B1 | 6/2001 | Killey | 523/204 |
| 6,316,082 | B1 | 11/2001 | Tomkins et al. | 428/202 |
| 6,488,794 | B1 * | 12/2002 | Bright et al. | 156/86 |
| 2001/0035265 | A1 | 11/2001 | Dronzek | 156/327 |

FOREIGN PATENT DOCUMENTS

| | | |
|---|---|---|
| EP | 1 122 173 | 8/2001 |
| EP | 1 162 588 | 12/2001 |
| GB | 2 315 357 | 1/1998 |
| WO | WO 99/47062 | 9/1999 |
| WO | WO 00/63087 | 10/2000 |

* cited by examiner

ADHESIVE COATED LABEL HAVING TACTILE FEEL

Pursuant to 37 C.F.R. §1.78(a)(4), this application claims the benefit of and priority to prior filed co-pending Provisional Application Ser. No. 60/389,633, filed Jun. 18, 2002, which is expressly incorporated herein by reference.

FIELD OF THE INVENTION

This invention relates to labels for containers, and more particularly to an adhesive coated label having tactile feel qualities.

BACKGROUND OF THE INVENTION

Printed labels are widely used on containers to identify the particular products, manufacturers, and brand names associated with the products in those containers. Conventional labels for containers include labels made from thin films wherein the thin film is clear and gives the appearance of having the graphics screen-printed directly onto the container. Thin film labels and other conventional labels generally have a viewable surface (i.e., facing outward from the container) which is flat and provides barely perceptible, if any, variation in the texture of the viewable surface. In some instances however, it may be desired to provide a label which has a tactile feel that enhances the aesthetic quality or appearance of the label. In this regard, the tactile feel of the label could provide a gripping surface for the product or may be used to enhance perception of quality of the container which, in turn, may inhere to the benefit of the contents of the container.

One possible way of providing a tactile feel to a label is to provide additional layers of ink to the label, such that printed indicia are perceptibly raised with respect to the surrounding areas. Inks, however, are generally expensive, compared to other components of the label. Accordingly, providing successive layers of ink, especially by processing a label through successive stages of equipment to obtain the multiple layers, may increase the cost of providing tactile feel to a point which is prohibitive.

There is thus a need for an adhesive coated label which provides a tactile feel and which overcomes various drawbacks of the prior art, such as those described above.

SUMMARY OF THE INVENTION

The present invention provides a label that has a tactile feel which enhances the aesthetic qualities of the label without prohibitively increasing the costs associated with making the label. In an exemplary embodiment, a label includes a clear film facestock having visible indicia disposed on one or both surfaces of the facestock. One or more layers of a clear tactile coating are selectively applied to discrete areas of the facestock to create distinct raised portions which are perceptible to the touch, and which may be visually perceptible as well. In another aspect of the invention, the facestock is a thin film material to which an adhesive layer is applied. A release liner disposed adjacent the adhesive protects the adhesive from contaminants and prevents premature adhesion of the label.

In another aspect of the invention, a series of adhesive coated labels having tactile feel are provided on a web of release liner wound into a roll for convenient storage and dispensing of the labels. In another aspect of the invention a product container includes a label having tactile feel.

In yet another aspect of the invention, a method of making a label having tactile feel includes the steps of applying visible indicia to a facestock layer of the label and selectively applying one or more layers of a clear tactile coating to discrete areas of the facestock to create distinct raised portions on a surface of the label. In another aspect, a method of making a label includes forming a laminate from a web of release liner, adhesive and a web of facestock material; applying indicia on a surface of the facestock material; and selectively applying tactile coating to discrete areas of the facestock material to create distinct raised portions on the label.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
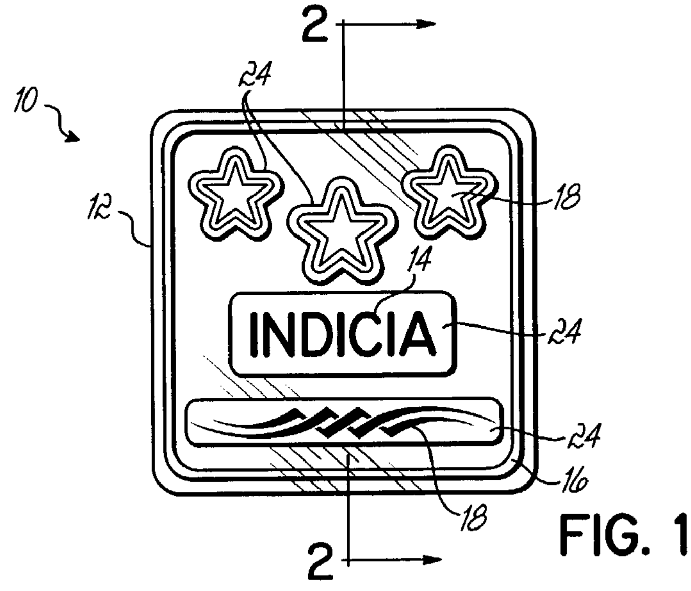
FIG. 1 is a plan view depicting an exemplary label of the present invention.

Referring to FIG. 1, there is shown an exemplary label 10 of the present invention. The label includes a facestock 12, which may be cut or otherwise formed into a discrete label shape, and visible indicia 14, 16, 18 selectively applied to a first side 20 of the facestock 12 to create letters, numbers, borders, decorative designs, or any combination thereof.

In the exemplary embodiment, the facestock 12 is a thin film formed from polypropylene, but it will be understood that the facestock 12 may be formed from any other material suitable for making labels, such as paper or other polymeric materials, such as polyethylene, PVC or other suitable materials. The visible indicia 14, 16, 18 of the exemplary label 10 are created by applying ink to the facestock 12 by methods known in the art, such as screen printing, gravure printing, lithography, flexography, or any other method suitable for creating the desired indicia 14, 16, 18. The indicia 14, 16, 18 may also include hot stamped foil or embossed images applied to the facestock 12.

Figure 2:
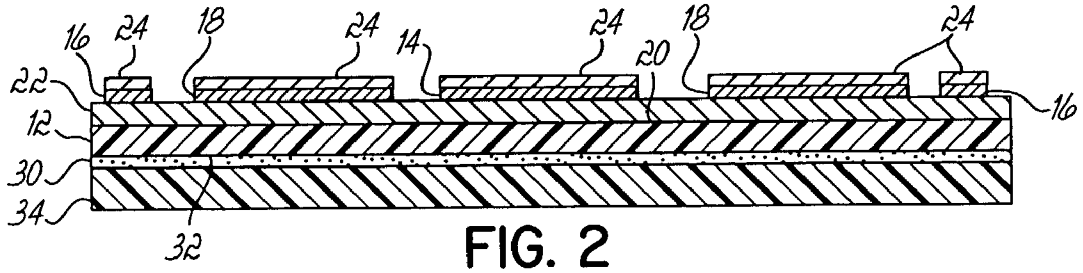
FIG. 2 is a cross-sectional view of the label of FIG. 1 taken along line 2—2.

With further reference to FIG. 2, the exemplary label 10 also includes one or more layers of tactile coating 24 which are selectively applied to discrete areas of the first side of the facestock 12 to create distinct raised portions on the label 10. In the exemplary embodiment shown, the label 10 further includes a primer layer 22 applied to substantially cover the first side 20 of facestock 12, whereafter indicia 14, 16, 18 and selectively applied tactile coating layers 24 are applied to the facestock 12. Alternatively, the indicia 14, 16, 18 and tactile coating layers 24 may be applied to selected areas of the facestock 12 without first applying a primer layer 22 to cover the first side 20.

In the exemplary embodiment shown in FIGS. 1 and 2, the selectively applied tactile coating layers 24 are applied to areas proximate the indicia 14, 16, 18, whereby the areas overlying the indicia 14, 16, 18 are elevated with respect to the surrounding portions of the label 10. In the exemplary label 10, the primer layer 22 and the tactile coating 24 are UV cured acrylic coatings, such as Clear Extender No. 4929 available from Sun Chemical Corporation, Northlake, Ill., but other coatings suitable for application to a label and which can be applied in successive layers may be used as well.

With continued reference to FIG. 2, the label 10 further includes an adhesive layer 30 which is applied to a second side 32 of the facestock 12, generally opposite the first side 20 on which the indicia 14, 16, 18, primer 22, and tactile coating 24 are applied. The adhesive 30 may be a pressure-sensitive adhesive, heat activated adhesive, water activated adhesive, or any other type of adhesive which is suitable for adhering a label 10 to a surface. In an exemplary embodiment, the adhesive 30 is a pressure-sensitive acrylic adhesive.

Figure 3:
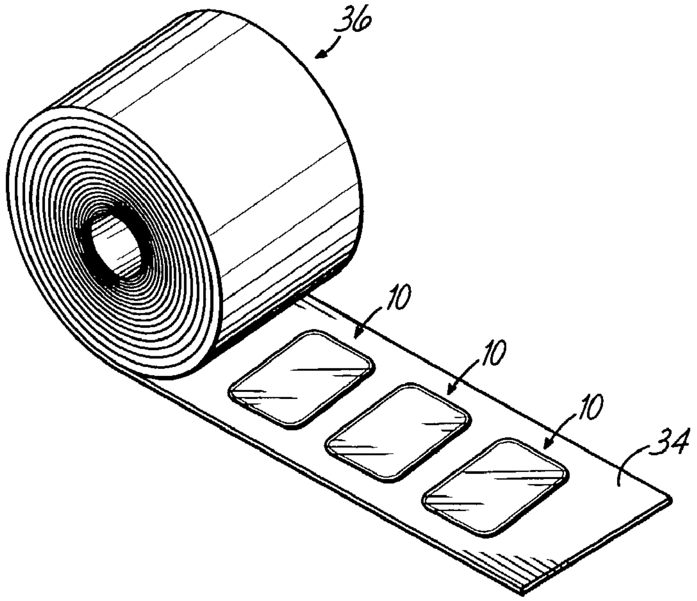
FIG. 3 is a perspective view depicting a roll of labels.

The label 10 may further include a release liner 34 applied to the second side 32 of the facestock 12, adjacent the adhesive 30, to protect the adhesive 30 from contaminants and to prevent premature adhesion of the label 10 to an object. The release liner 34 may be formed from any suitable material, such as polyester film or paper. In an exemplary embodiment, the release liner 34 is an elongate web of material which can support several individual labels 10. Accordingly, the elongate web of release liner 34 may be wound into a roll 36 for convenient storage and dispensing of the labels 10, as depicted in FIG. 3.

Figure 4:
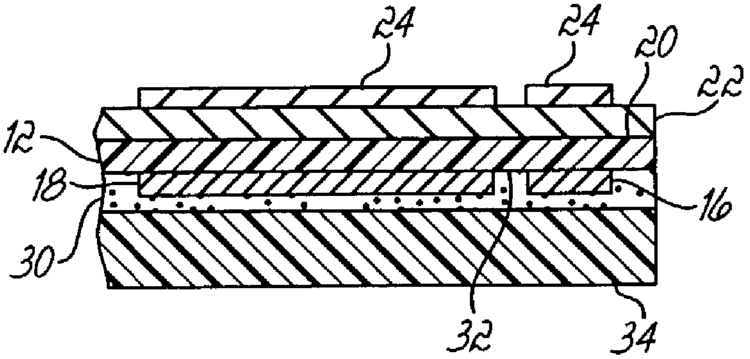
FIG. 4 is a partial cross-sectional view of an alternate exemplary embodiment of the label of FIG. 1.

Referring to FIG. 4, there is shown another exemplary embodiment of the label 10 according to the present invention. In this embodiment, the indicia 14, 16, 18 are applied to the second side 32 of the facestock 12 and the adhesive 30 thereafter applied to the second side 32, over the indicia 14, 16, 18. When the facestock 12 is a clear film, the indicia 14, 16, 18 will be viewable from the first side 20 of the facestock 12. Accordingly, the images and lettering comprising the indicia 14, 16, 18 will generally be applied to the second side 32 in reverse image so that they may be properly viewed from the first side 20. Advantageously, the clear film provides a protective barrier for the visible indicia 14, 16, 18. In this embodiment, the tactile coating layers 24 are selectively applied to discrete areas of the first side 20 of the facestock 12 to create the desired raised portions.

Figure 5:
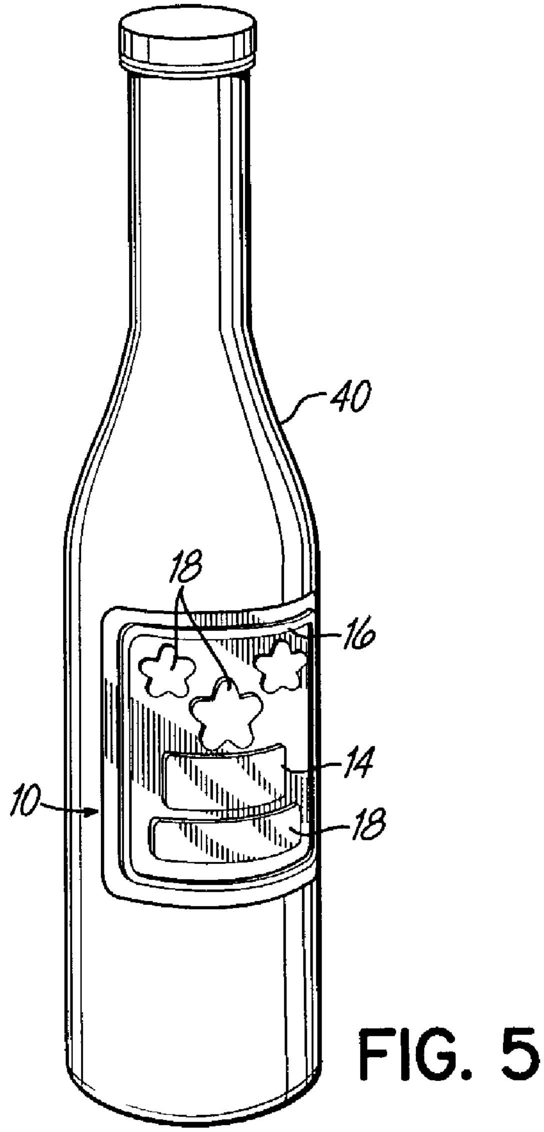
FIG. 5 is a perspective view of an exemplary container including a label of FIG. 1.

Advantageously, the raised portions of the inventive label 10 provide a tactile feel to the label 10 which is not present on prior art labels. The tactile feel may provide a gripping surface for a container 40 to which the label is applied, and/or may increase the aesthetic appearance of the labels 10. Referring to FIG. 5, there is shown an exemplary container 40 including a label 10 of the present invention. The label 10 may be applied to the container 40 by various means, such as automatic equipment having peel-plate stations to dispense labels 10 to containers 40.

An exemplary adhesive coated label 10 of the present invention may be made by applying visible indicia 14, 16, 18 to a facestock 12 and then selectively applying one or more tactile coating layers 24 to discrete areas of the facestock 12 to create distinct raised portions on the label 10. In another exemplary method, a label 10 of the present invention is made by forming a laminate from an elongate web of liner material 34, a facestock 12 in the form of an elongate label film, and adhesive 30 disposed therebetween; selectively applying indicia 14, 16, 18 to the facestock 12, selectively applying tactile coating 24 to discrete areas of the facestock to create distinct raised portions on the label 10, and die cutting the facestock 12 to define discrete labels 10.

While the present invention has been illustrated by the description of the various embodiments thereof, and while the embodiments have been described in considerable detail, it is not intended to restrict or in any way limit the scope of the appended claims to such detail. For example, while the exemplary labels 10 have been described herein as having indicia 14, 16, 18 applied to either the first side 20 or the second side 32 of the facestock 12, it will be recognized that the indica 14, 16, 18 may alternatively be applied to both sides 20, 32 of the facestock 12.

Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

The invention claimed is:

1. An adhesive coated label, comprising:

a continuously flat facestock layer having first side and an opposite second side;

printed visible ink indicia selectively applied to one or more portions of said second side of said facestock layer;

at least one clear tactile coating layer selectively applied to discrete portions of said first side of said facestock layer to create distinct raised portions on the label for tactile feel, the tactile coating layer is different from the visible ink indicia; and an adhesive layer applied to said second side of said facestock layer.

2. The label of claim 1, further comprising a primer applied to said first side of said facestock layer prior to applying said ink indicia.

3. The label of claim 1, wherein said tactile coating layer is applied to said first side of said facestock layer such that the location of said tactile coating layer substantially corresponds to the location of at least a portion of said visible indicia.

4. The label of claim 1, wherein said facestock layer comprises a thin film.

5. The label of claim 1, further comprising a release liner disposed adjacent said adhesive layer.

6. A labeled product package, comprising:

a container having a surface for receiving a label; and a label disposed on said surface, said label comprising:

a continuously flat facestock layer having a first side and an opposite second side, printed visible ink indicia selectively applied to one or more portions of said second side of said facestock layer, at least one clear tactile coating layer selectively applied to discrete portions of said first side of said facestock layer to create distinct raised portions on the label for tactile feel, the tactile coating layer is different from the visible ink indicia, and an adhesive layer applied to said second side of said facestock layer and adhered to said container surface.

7. The labeled product package of claim 6, wherein said selectively applied tactile coating layer is applied to said first side of said facestock layer such that the location of said tactile coating layer substantially corresponds to the location of at least a portion of said visible indicia.

8. The labeled product package of claim 6, further comprising a primer applied to said first side of said facestock layer prior to applying said ink indicia.

9. A supply of adhesive coated labels, comprising:

an elongate web of liner material for supporting labels; and a plurality of discrete labels releasably disposed on said liner material, each of said labels comprising:

a continuously flat facestock layer having a first side and an opposite second side;

printed visible ink indicia selectively applied to one or more portions of said second side of said facestock layer, at least one clear tactile coating layer selectively applied to discrete portions of said first side of said facestock layer to create distinct raised portions on the label for tactile feel, the tactile coating layer is different from the visible ink indicia, and an adhesive layer applied to said second side of said facestock layer and adhered to said web of liner material.

10. The supply of adhesive coated labels of claim 9, wherein said labels further comprise a primer applied to said first side of said facestock layer prior to applying said ink indicia.

11. A method of making an adhesive coated label, comprising:

providing a continuously flat facestock layer having a first side and an opposite second side applying printed visible ink indicia to one or more portions of a second side of said facestock layer;

selectively pre-applying at least one clear layer of tactile coating to discrete portions of the first side of said facestock layer to create distinct raised portions on the label for tactile feel, the tactile coating layer is different from the visible ink indicia; and applying an adhesive layer to said second side of said facestock layer.

* * * * *